219-121
6/16/87    OR    4,673,795    SR

United States Patent [19]
Ortiz, Jr.

[11] Patent Number: 4,673,795
[45] Date of Patent: Jun. 16, 1987

[54] INTEGRATED ROBOTIC LASER MATERIAL PROCESSING AND IMAGING SYSTEM

[75] Inventor: Angel L. Ortiz, Jr., Ballston Lake, N.Y.

[73] Assignee: General Electric Company, Schenectady, N.Y.

[21] Appl. No.: 660,837

[22] Filed: Oct. 15, 1984

[51] Int. Cl.[4] .............................................. B23K 26/00
[52] U.S. Cl. ........................ 219/121 L; 219/121 LB; 219/121 LC; 219/121 LU; 219/121 LR
[58] Field of Search ............... 901/47, 42, 9; 414/730; 219/121 LZ, 121 LV, 124.34, 121 LR, 121 LQ, 121 LX, 121 LA, 121 LB, 121 LC, 121 LD, 121 LG, 121 LN, 121 L, 121 LM, 121 LK, 121 LL

[56] References Cited

U.S. PATENT DOCUMENTS

| | | | |
|---|---|---|---|
| 3,096,767 | 7/1963 | Gresser et al. | 219/121 LZ X |
| 3,976,382 | 8/1976 | Westby | 356/376 |
| 4,410,787 | 10/1983 | Kremers et al. | 219/124.34 |
| 4,412,121 | 10/1983 | Kremers et al. | 219/124.34 |
| 4,417,127 | 11/1983 | Nachev et al. | 219/124.34 |
| 4,443,684 | 4/1984 | Sakuragi et al. | 219/121 LH |
| 4,450,339 | 5/1984 | Corby, Jr. | 219/124.34 |
| 4,532,405 | 7/1985 | Corby, Jr. et al. | 219/124.34 |
| 4,578,554 | 3/1986 | Coulter | 219/121 LV |

FOREIGN PATENT DOCUMENTS

| | | | |
|---|---|---|---|
| 57-92133 | 6/1982 | Japan . | |
| 0121095 | 6/1985 | Japan | 219/121 LZ |

OTHER PUBLICATIONS

W. B. Jones, "The Slab Geometry Laser", *Laser Focus (Electro-Optics)*, vol. 19, No. 9, Sep. 1983.

M. G. Jones and G. Georgalas, "Low Divergence Beam Processing with a 1.06 Micrometer Total Internal Reflection Face Pumped Laser", *Laser News*, vol. 6, No. 3, May 1984.

*Primary Examiner*—C. L. Albritton
*Attorney, Agent, or Firm*—Paul R. Webb, II; James C. Davis, Jr.

[57] ABSTRACT

High power laser energy for material processing is delivered via a high energy optical fiber to a remote output module carried by an industrial robot. A plural path optical system within the output module focuses the high-energy laser onto the material to be processed, and additionally transmits images for closed-loop robotic control through one or more fiber optic bundles. Thus vision and seam tracking for an industrial robot are integrated with a neodymium: yttrium-aluminum-garnet laser. To provide an interlock which guards against interruption of the high energy optical fiber, a laser transmission sensor is included within the remote module. A wide range of closed-loop laser materials processing operations can be performed, such as cutting, welding, drilling and heat treatment. The processing operations can be performed even on complex, three-dimensional parts.

18 Claims, 4 Drawing Figures

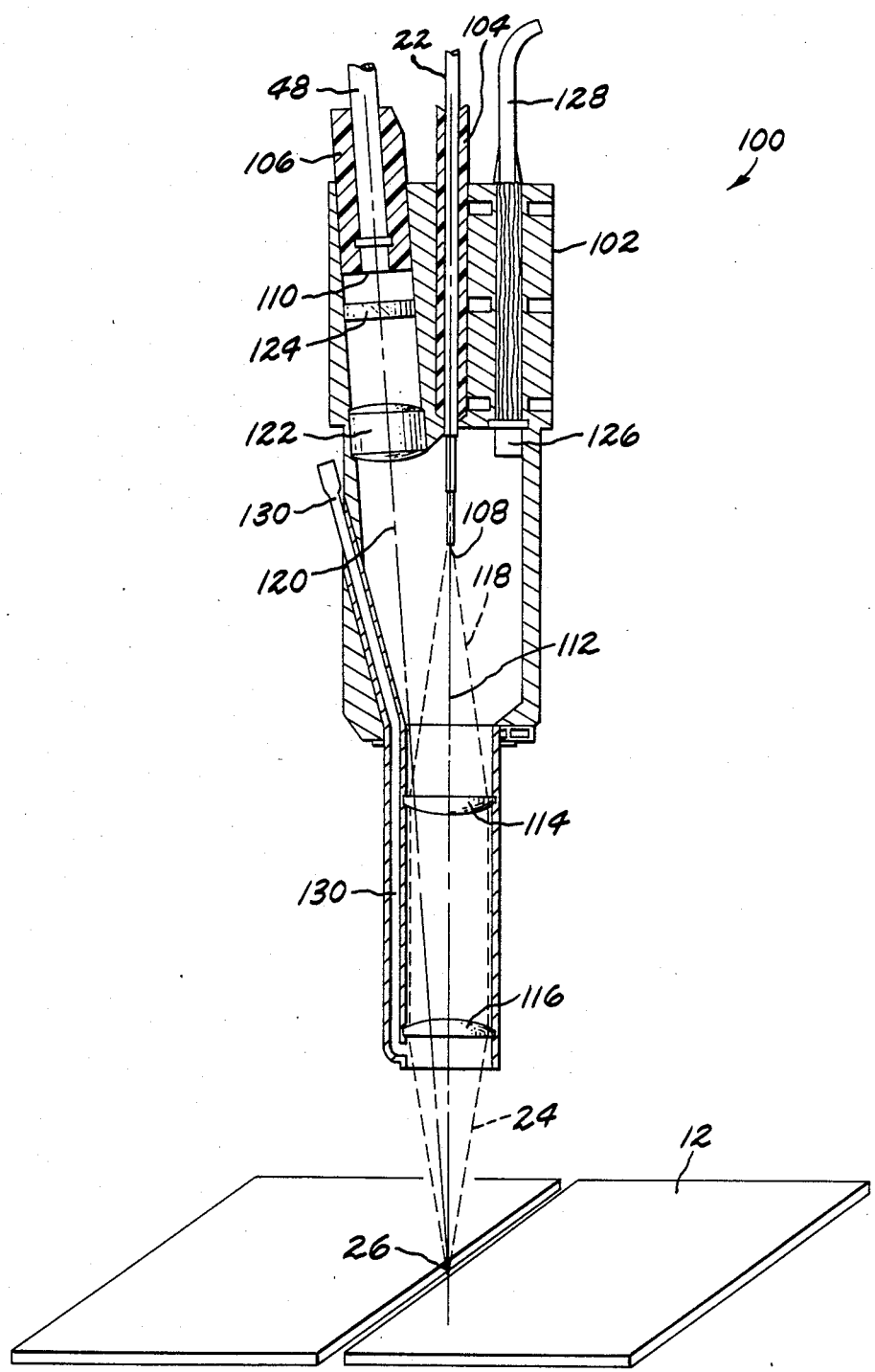

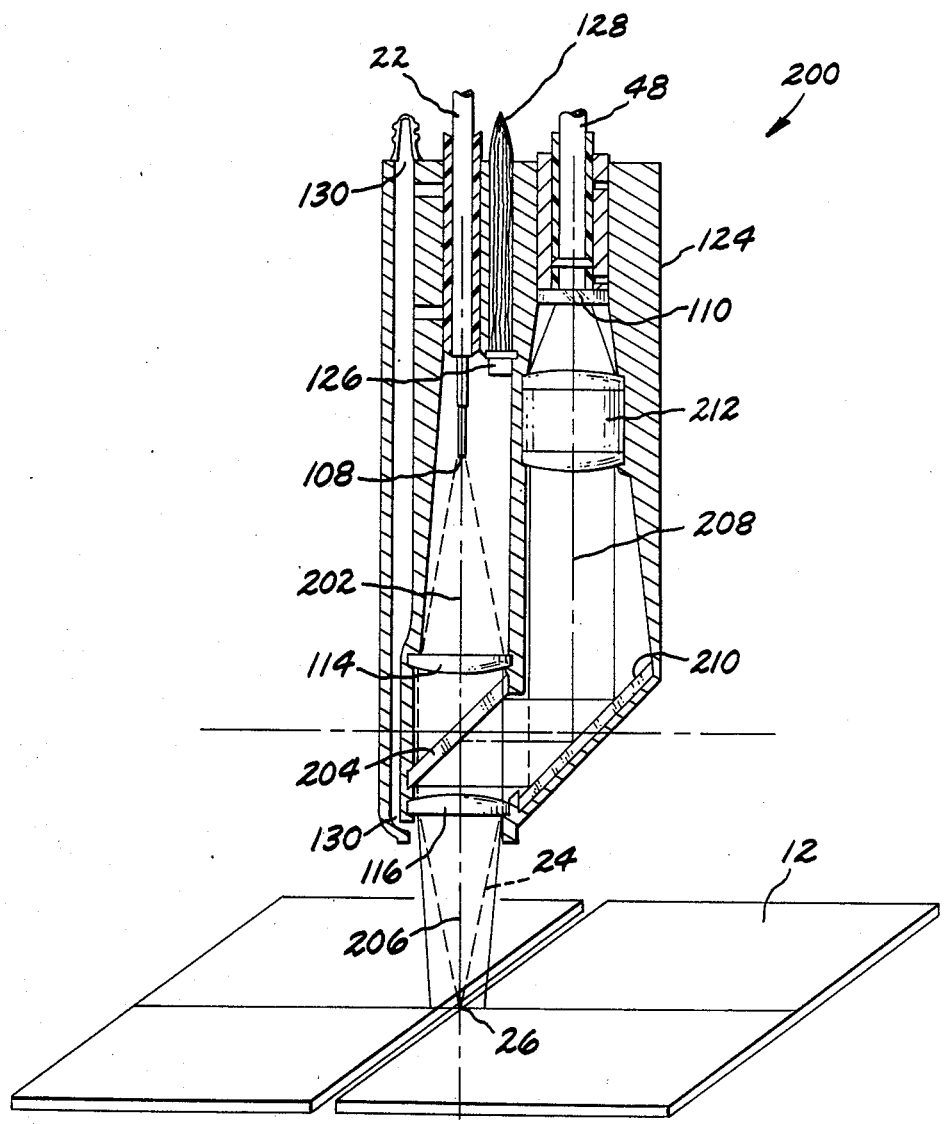

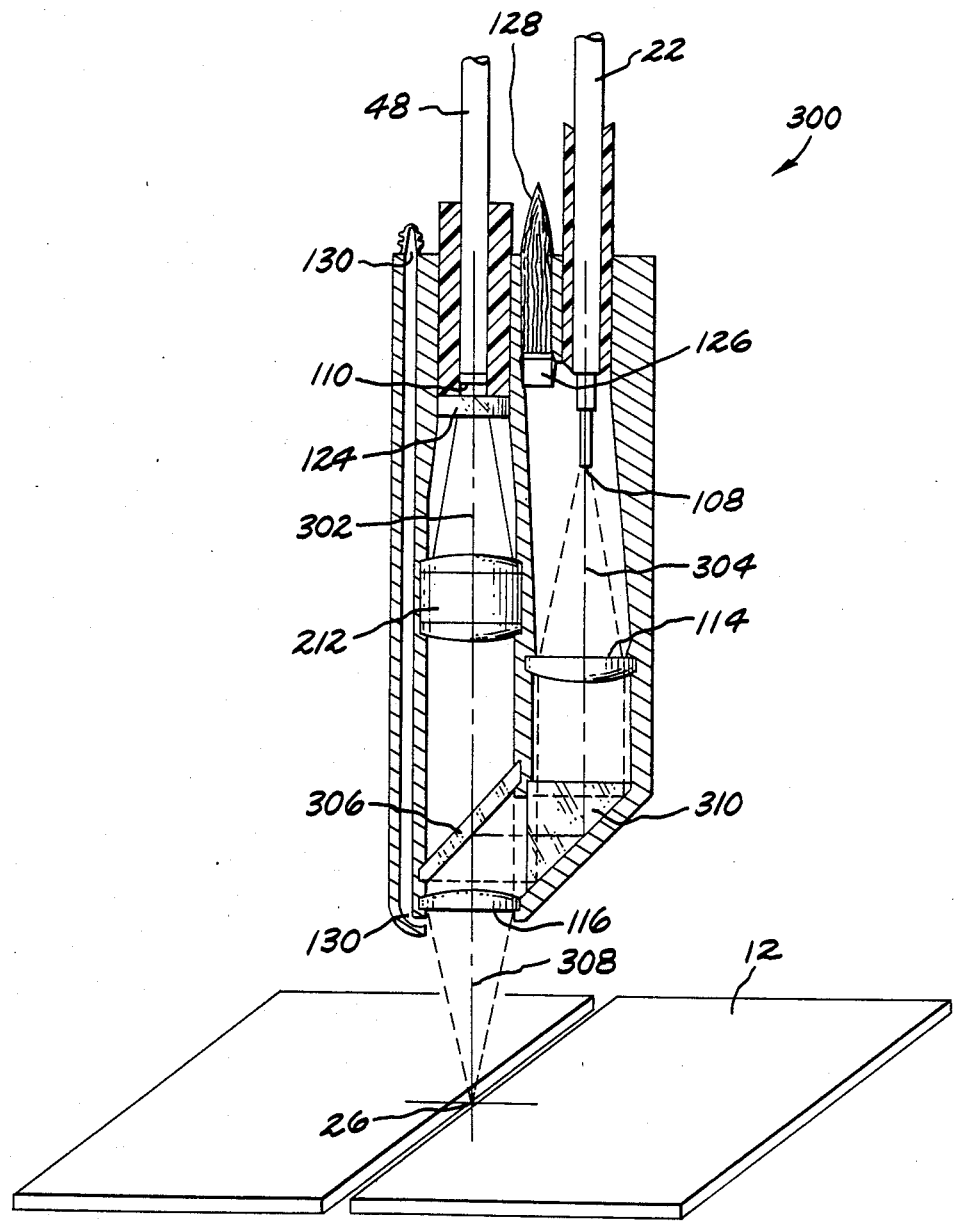

INTEGRATED ROBOTIC LASER MATERIAL PROCESSING AND IMAGING SYSTEM

BACKGROUND OF THE INVENTION

The present invention relates to closed-loop robotic material processing operations such as cutting, welding, drilling, heat treatment and the like employing laser energy.

A variety of industrial robots have been developed which employ closed-loop feedback for precise control of material processing operations. An important example is electric arc welding by robotic manipulation of a welding head along a seam. To this end, various seam tracking systems have been developed which, in general, project a striped light pattern accross the seam and at the same time view the pattern to determine the position of the seam. Seam tracking and vision have been integrated with tungsten-inert-gas (TIG) and metal-inert-gas (MIG) welding processes. Examples of welding torches integrated with seam tracking are disclosed, for example, in commonly-assigned Corby, Jr. U.S. Pat. No. 4,450,339 and Nachev et al. U.S. Pat. No. 4,417,127. Other examples of robotic control of welding processes are disclosed in Kremers et al. U.S. Pat. Nos. 4,412,121, 4,410,787 and Westby U.S. Pat. No. 3,976,382.

In addition to conventional welding processes, material processing lasers have also been integrated to industrial robots employing fiber optic cables to transmit laser energy to a robotic tool for various material processing operations, such as the above-noted cutting, welding, drilling, and heat treatment. In such systems, laser energy in the near infrared and visible spectrum is transmitted through an optical fiber at power levels sufficient for material processing. Laser material processing has a number of advantages over arc welding, such as lower (but more highly focused) heat input, less distortion, and a higher quality weld.

As one example, the system disclosed in Sakuragi et al. U.S. Pat. No. 4,443,684 includes a $CO_2$ laser (generating energy at a wavelength of 10.6 micrometers) coupled through an optical fiber to an output end carried by the carriage of an XY plotter adapted for the purpose. Workpieces to be thermally transformed are placed on the normal working surface of the plotter, and the carriage then travels thereover. In order to measure temperatures of workpieces to be machined, the system of of U.S. Pat. No. 4,443,684 includes another optical fiber for transmitting infrared rays from the workpiece to a detector.

Although robotic control is not disclosed, heat treatment by laser beam transmitted through an optical fiber is disclosed in Japanese Patent Document (KOKAI) No. S.57 (1982) - 92133. In the system of this Japanese Patent Document, 1.06 micrometer laser energy from a YAG laser is coupled through a glass fiber to an output element for heat treatment of small teeth. It is mentioned that the heat treatment of the workpiece might be observed and recorded through a television monitor by including an optic system such as a half-mirror in the output element.

Further examples of laser material processing through an optical fiber are disclosed in commonly-assigned U.S. patent application Ser. No. 450,951, filed Dec. 20, 1982 by M. G. Jones and G. Georgalas entitled "Laser Material Processing Through a Fiber Optic", and in commonly-assigned Application Ser. No. 608,042, filed May 7, 1984, by M. G. Jones and D. C. Richardson, entitled "Industrial Hand Held Laser Tool and Laser System".

Yet another example is disclosed in commonly-assigned U.S. patent application Ser. No. 649,125 filed Oct. 9, 1984 by M. G. Jones, entitled "High Power Laser Energy Delivery System" which discloses the use of an Nd:YAG total-internal-reflection, face-pumped laser (TIR-FPL) coupled to an optical fiber having a diameter less than 600 micrometers for transmitting material processing laser energy to a workpiece.

SUMMARY OF THE INVENTION

It is an object of the invention to incorporate vision and seam tracking with laser processing by robots for automated processing of both simple and complex three-dimensional parts and shapes.

It is another object of the invention to provide a versatile robotic tool capable of performing a wide variety of laser materials processing tasks such as welding, cutting, alloying, heat treatment, drilling and others on many parts without changing or modifying the processing tool.

It is yet another object of the invention to integrate vision and seam tracking capability with material processing by laser energy transmitted through an optical fiber to provide a flexible robotic manufacturing tool.

Briefly, in accordance with the invention, an integrated laser material processing and imaging system includes a material processing laser, such as a 1.06 micrometer wavelength neodymium:yttrium-aluminum-garnet (Nd:YAG) laser for providing a laser beam. For closed-loop robotic control, the system includes an image processing device for receiving and processing an image. A remote module, which also may be termed an output module is included and is adapted for manipulation by a robot in the proximity of a workpiece.

Material processing laser energy is transmitted by a high energy optical fiber, the input end of which is coupled to receive the beam from the material processing laser, and the output end of which is connected to the remote module. In addition, there is a fiber optic bundle for transmitting an image. One end of the fiber optic bundle is coupled to the image processing device, and the other end of the fiber optic bundle is connected to the remote module. For integrating vision, seam tracking and laser material processing functions, the remote module includes a plural path optical system both for focusing the laser beam merging from the output end of the high energy optical fiber along a first optical path to a focal point on the workpiece and for imaging a portion of the workpiece along a second optical path onto the other end of the fiber optic bundle. The optical system has a single objective lens which serves both the first and second optical paths. So that energy from the material processing laser does not interfere with imaging, and to prevent damage to the fiber optic bundle from any of the high energy beam which is reflected, a filter is included in the second optical path to block transmission of light at the wavelength of the material processing laser.

For seam tracking applications, the system also includes a seam tracking generator coupled to the one end of the fiber optic bundle (or of a separate fiber optic bundle) for projecting a seam tracking pattern, i.e. a pair of stripes, onto the workpiece for viewing by the image processing device.

Preferably, an interlock arrangement is also provided which operates in combination with a controller for turning the beam from the laser OFF and ON. The interlock arrangement includes a laser transmission sensor in the remote module connected to the controller for turning the laser beam off when the laser beam has turned on but laser energy does not reach the remote module, indicating a break in the high energy optical fiber.

In a first particular embodiment of the invention, the output end of the high energy optical fiber and the first optical path are physically on an in-line axis in axial alignment with the objective lens, and the other end of the fiber optic bundle and the second optical path are physically on a slant axis which intersects the in-line axis at the focal point. Compensating optics are included in the second optical path to ensure the imaged portion of the workpiece is focused onto the fiber optic bundle.

In a second embodiment, the second (imaging) optical path is folded by suitable reflecting elements. In this embodiment, the output end of the high energy optical fiber and the first optical path are physically on an in-line axis in axial alignment with the objective lens as in the first embodiment. The other end of the fiber optic bundle is physically on an imaging axis which is non-coincident with the in-line axis. A dichroic window is positioned on the in-line axis behind the object lens to define a portion of the in-line axis between the dichroic window and the focal point as a common axis portion. The dichroic window is angled so as to reflect images between the common axis portion and the imaging axis such that the common axis portion, the dichroic window and the imaging axis are included in the second optical path. At the same time, the dichroic window transmits laser energy on the first optical path. Preferably, an image reflecting element cooperates with the dichroic window to fold the second optical path such that the imaging axis is parallel to the inline axis.

In a third embodiment, it is the first (laser energy delivery) optical path which is folded, while the imaging axis follows a straight line. In this embodiment, the other end of the fiber optic bundle and the second optical path are physically on the in-line in axial alignment with the objective lens. The output end of the high energy optical fiber is physically on an energy delivery axis which is noncoincident with the in-line axis. A dichroic mirror is positioned on the in-line axis behind the objective lens to define a portion of the in-line axis between the dichroic mirror and the focal point as a common axis portion. The dichroic mirror is angled so as to reflect laser energy from the energy delivery axis onto the common axis portion such that the common axis portion, the dichroic mirror and the energy delivery axis are included in the first optical path. In this embodiment, the dichroic mirror transmits images on the second optical path.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 2 is a cross-section of a first embodiment of a remote (output) module for use in the system in FIG. 1;

FIG. 3 is cross-sectional view of a second embodiment of a remote (output) module for use in the system of FIG. 1; and FIG. 4 is a cross-sectional view of a third embodiment of a remote (output) module for use in the closed-loop robotic materials processing system of FIG. 1.

DETAILED DESCRIPTION

Figure 1:
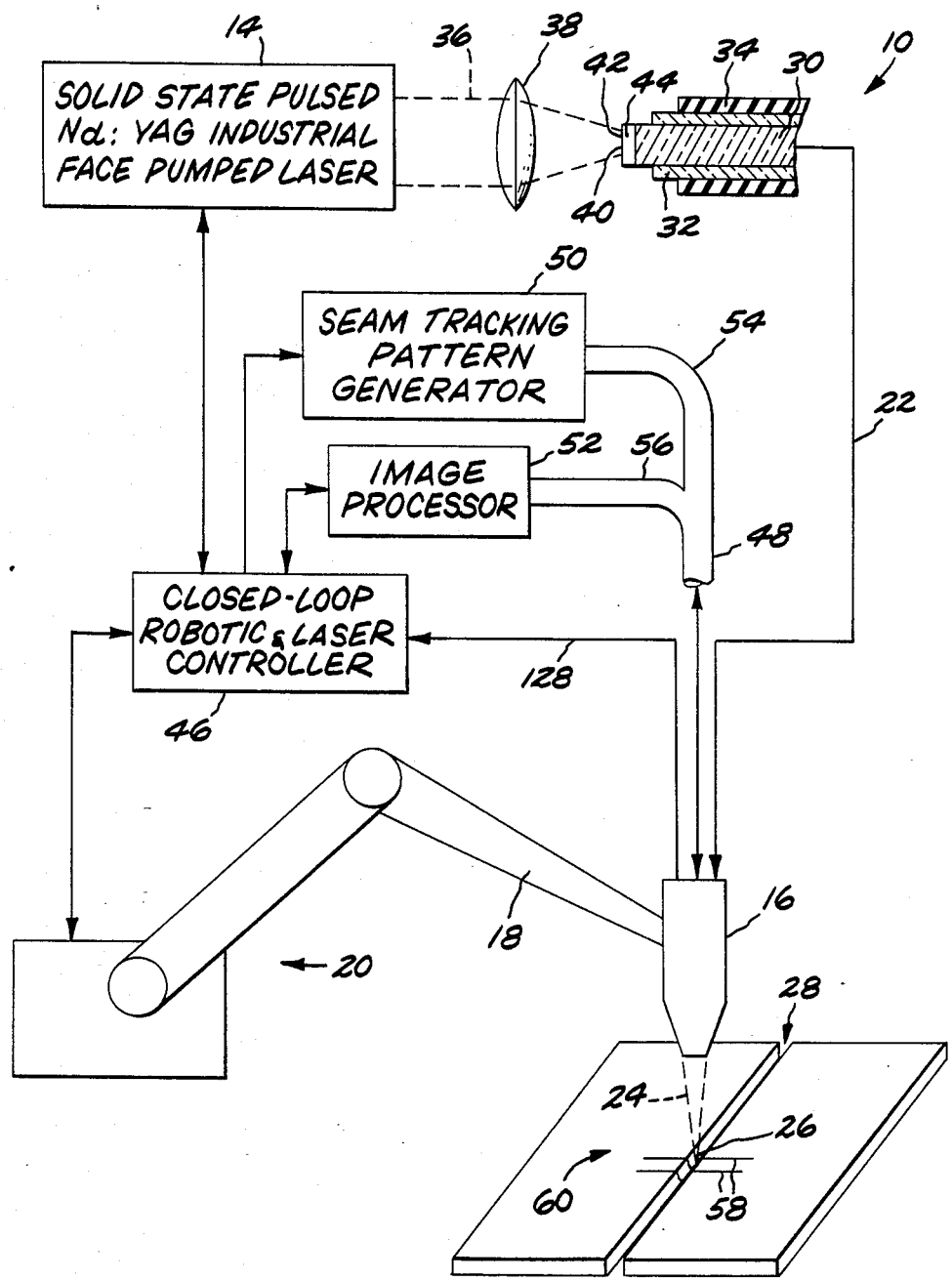
FIG. 1 is an overall schematic illustration of a closed-loop robotic materials processing system including vision and seam tracking integrated with an Nd:YAG laser for material processing.

In FIG. 1, a closed-loop robotic system 10 is provided for materials processing, such as exemplary seam-welding of a workpiece 12, employing energy from a solid-state pulsed Nd:YAG industrial face-pumped laser 14 operating at a wavelength of 1.06 micrometers with an average output power of in the order of 400 watts. A remote or output module 16 is provided and is adapted for manipulation by the arm 18 of an industrial robot, generally represented at 20.

A single-core optical fiber 22 transmits energy from the laser 14 to the remote module 16 to be collimated and focused by an optical system (alternative forms of which are described hereinbelow with reference to FIGS. 2, 3 and 4) within the remote module 16 to emerge as rays 24 focused to a point 26 on the workpiece 12 to effect welding of a representative seam 28. The optical fiber 22 comprises a 1000 micrometer (0.040 inch) diameter fused quartz core 30 with clear silicon cladding 32 and an outer nylon jacket 34 for physical protection. A beam 36 emerging from the laser 14 is focused by a lens 38 to a spot 40 on the end 42 of the optical fiber 22. To enhance transmission of the laser beam 36 energy into the optical fiber 22, an antireflective coating 44 is provided on the end 42.

Various techniques for the efficient coupling of such laser energy into a fiber optic core are described in the above-referenced commonly-assigned U.S. patent application Ser. Nos. 450,951, 608,042, and 659,125, the entire disclosures of which are hereby expressly incorporated by reference. Pulsed Nd:YAG industrial total-internal-reflection face-pumped lasers (TIR-FPL) are described in W. B. Jones, "The Slab Geometry Laser", *Laser Focus/Electro-Optics*, Volume 19, Number 9, September 1983; and M. G. Jones and G. Georgalas, "Low Divergence Beam Processing with a 1.06 Micrometer Total Internal Reflection Face Pumped Laser", *Laser News*, Volume 6, Number 3, May 1984.

For controlling the overall operation of the system, a closed-loop robotic controller 46 is provided, which operates generally in accordance with known principles employing vision and seam tracking for guiding the robot arm 18 and operating the laser 14. To serve these functions a fiber optic bundle generally designated 48 for transmitting images is connected between the remote module 16 and both a seam tracking pattern generator 50 and an image processor 52. Thus, the fiber optic bundle 48 has two branch bundles 54 and 56. It will be appreciated that the two bundles 54 and 56 may continue as separate entities to the remote module 16, or be joined together as the common bundle 48. In either event, some of the individual optical fibers in the bundles are employed for image transmission from the module 16, while others are employed for image projection to the module 16.

The seam tracking pattern generator 50 may be a conventional one and generates a suitable pattern, such as a pair of parallel strips or concentric circles and transmits the pattern down the fiber optic bundles 54 and 48 for projection onto the workpiece 12 as exemplary lines 50. At the same time, image information from a portion 60 of the workpiece 12 around the focal point 26 is transmitted in the opposite direction through the bundles 48 and 56 for processing by the image processor 52. With this information, the controller 46 is able to issue commands to the robot 20 for guiding the remote module 16 along the seam, while at the same time controlling various other parameters, such as output by the laser 14 itself, to effect a proper weld.

Advantageously, the remote module 16 includes a plural path optical system both for focusing the laser beam emerging from the output end of the high energy optical fiber 22 along a first optical path to the focal point 26 on the workpiece 12, and for imaging the portion 60 of the workpiece 12 along a second optical path onto the remote end of the fiber optic bundle 48. As will be seen from the specific embodiments of FIGS. 2, 3 and 4 described hereinbelow, a characteristic of the optical system 16 within the remote module is that it includes a single objective lens.

Although shown as welding, it will be appreciated that such a system allows a wide variety of material processing operations to be performed, including, but not limited to, welding, cutting, alloying, heat treatment and drilling. Moreover, operations on complex three-dimensional parts can be performed. Thus, a flexible manufacturing tool is provided.

Referring now to FIG. 2, shown in cross-section is a first embodiment 100 of a remote module suitable for use as a module 16 in the system 10 of FIG. 1. The module 100 is of generally tubular construction and includes a mainframe 102 having suitable holders 104 and 106 for respectively securing the output end 108 of the high energy optical fiber 22 and the module end 110 of the fiber optic bundle 48, or of individual bundles 54 and 56. Axially in line with the end 108 of the high-energy fiber 22 and physically on an in-line axis 112 therewith, are an anti-reflective coated collimating lens 114 and a coated objective lens 116.

Thus, the collimating lens 114 collimates the diverging beam 118 emerging from the high energy fiber end 108, while the objective lens 116 focuses the beam to the laser processing focal point 26. The lens coatings minimize laser energy losses.

On a slant axis 120 with respect to the inline axis 112 is the end 110 of the fiber optic bundle 48 for vision and seam tracking. The center line of the axis 120 intersects the in-line axis 112 at the laser processing focal point 26. In order to properly focus images of the laser process and workpiece surfaces onto the vision and seam tracking laser bundles 44, a compensating lens 122 is included on the second optical path. For preventing damage from the reflected high energy beam, the second optical path also includes a 1.06 micrometer filter 124.

An important element of the remote module 100 is a laser transmission sensor 126. This laser transmission sensor 126 comprises a silicon photodiode with an internal integrated amplifier having very low thermal drift and designed to detect 1.06 micrometer laser energy with 80% relative responsivity. A suitable sensor is Centronic Part No. OSI-5L. The laser transmission sensor 126 is connected via a cable 128 to the FIG. 1 controller 46 and thus to control elements such as a shutter (not shown) associated with the laser 14. The laser transmission sensor 126 comprises an interlock arrangement to detect a break in the high-energy optical fiber 22 and to shut down operation in response thereto. In particular, if the beam from the laser is turned ON but its presence is not immediately sensed by the sensor 126, a break is indicated, and the controller 52 immediately turns the laser 14 OFF.

A final element of the module 100 is a conduit 130 for delivering suitable processing gas to the vicinity of the workpiece appropriate to the process being performed.

With reference now to FIG. 3, another output module embodiment 200 is depicted which is physically smaller in size and less complex in alignment compared to the FIG. 2 embodiment. In FIG. 3, the end 108 of the high-energy optical fiber is physically on an inline axis 202 with a collimating lens 114 and an objective lens 116.

A dichroic window 204 oriented at 45° is positioned on the in-line axis 202 to define a portion 206 of the in-line axis 202 as a common axis portion. The 45° angle of the dichroic window 204 allows the dichroic window to reflect images between the common axis portion 206 and an imaging axis 208, aided by an imaging reflecting element 210 in the form of a mirror. Suitable optics 212 provide the necessary compensation such that a portion of the workpiece 12 at the laser focal plane is imaged onto the end 110 of the fiber optic bundle. The FIG. 3 optical system is somewhat simpler than that of the FIG. 2 system in that imaging is not angled. In addition, compensation for the imaging optical path is simplified because images do not pass through the collimating lens 114.

FIG. 4 depicts a third embodiment where it is the energy delivery optical path which is folded, and the imaging path is straight. Thus, the end 110 of the fiber optic bundle and the second optical path are physically on an in-line axis 302 in axial alignment with the objective lens 116. The output end 108 of the high-energy optical fiber is physically on an energy delivery axis 304 which is non-coincident with the in-line axis 302, and preferably parallel thereto.

An anti-reflective coated, 100% dichroic mirror 306 is positioned on the in-line axis 302 behind the objective lens 116 to define a portion 308 of the in-line axis 302 between the dichroic mirror 306 and the laser energy focal point 322 as a common axis portion.

The dichroic mirror 306 is coated for 100% 1.06 micrometer reflection at 45°. An anti-reflective coated right angle prism 310 completes the folding of the first optical path for laser energy delivery.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An integrated laser material processing and imaging system comprising:
   a material processing laser for providing a laser beam;
   an image processing device for receiving and processing an image;
   a remote module adapted for manipulation by a robot in the proximity of a workpiece;
   a high energy optical fiber for transmitting material processing laser energy, the input end of said high energy optical fiber coupled to receive the beam from said material processing laser, and the output end of said high energy optical fiber connected to said remote module;

a fiber optic bundle for transmitting an image, one end of said fiber optic bundle coupled to said image processing device, and the other end of said fiber optic bundle connected to said remote module; and a plural path optical system in said remote module for focusing the laser beam emerging from the output end of said high energy optical fiber along a first optical path to a focal point on the workpiece and for imaging a portion of the workpiece along a second optical path onto said other end of said fiber optic bundle, said optical system including:

a single objective lens serving both said first and said second optical paths;

a holder supporting said other end of said fiber optic bundle physically on an in-line axis in axial alignment with said objective lens and comprising said second optical path;

elements for folding said first optical path between a common axis portion including said objective lens and an energy delivery axis which is non-coincident with said in-line axis; and a holder supporting said output end of said high energy optical fiber on said energy delivery axis.

2. A system in accordance with claim 1, wherein said elements for folding said first optical path comprise a dichroic mirror positioned on said inline axis behind said objective lens to define said common axis portion as that portion of said in-line axis which is between said dichroic mirror and the focal point, said dichroic mirror being angled so as to reflect laser energy from said energy delivery axis onto said common axis portion, while transmitting images on said second optical path.

3. A system in accordance with claim 2, wherein said energy delivery axis is parallel to said in-line axis, and wherein said elements for folding said first optical path further comprise a laser beam reflecting element cooperating with said dichroic mirror.

4. A system in accordance with claim 3, wherein said laser beam reflecting element comprises a right angle prism.

5. A system in accordance with claim 1, wherein said material processing laser comprises a 1.06 micrometer wavelength neodymium; yttrium aluminum garnet laser.

6. A system in accordance with claim 1, which further comprises a filter in said second optical path to block transmission of light at the wavelength of said material processing laser.

7. A system in accordance with claim 1, which further comprises:

a controller for turning the beam from said laser OFF and ON; and an interlock arrangement including a laser transmission sensor in said remote module connected to said controller for turning the laser beam OFF when the laser beam has been turned ON but laser energy does not reach said remote module, indicating a break in said high energy optical fiber.

8. A system in accordance with claim 1, which further comprises a seam tracking pattern generator coupled to said one end of said fiber optic bundle for projecting a seam tracking pattern onto the workpiece for viewing by said imaging processing device.

9. An integrated laser material processing and imaging system comprising:

a material processing laser for providing a laser beam;

a controller for turning the beam from said laser OFF and ON;

an image processing device for receiving and processing an image;

a remote module adapted for manipulation by a robot in the proximity of a workpiece;

an interlock arrangement including a laser transmission sensor in said remote module connected to said controller for turning the laser beam OFF when the laser beam has been turned ON but laser energy does not reach said remote module, indicating a break in said high energy optical fiber;

a high energy optical fiber for transmitting material processing laser energy, the input end of said high energy optical fiber coupled to receive the beam from said material processing laser, and the output end of said high energy optical fiber connected to said remote module;

a fiber optic bundle for transmitting an image, one end of said fiber optic bundle coupled to said image processing device, and the other end of said fiber optic bundle connected to said remote module; and said remote module including a plural path optical system for focusing the laser beam emerging from the output end of said high energy optical fiber along a first optical path to a focal point on the workpiece and for imaging a portion of the workpiece along a second optical path onto said other end of said fiber optic bundle, said optical system having a single objective lens serving both said first and said second optical paths.

10. An integrated laser material processing and imaging system comprising:

a material processing laser for providing a laser beam;

a controller for turning the beam from said laser OFF and ON;

an image processing device for receiving and processing an image;

a remote module adapted for manipulation by a robot in the proximity of a workpiece;

an interlock arrangement including a laser transmission sensor in said remote module connected to said controller for turning the laser beam OFF when the laser beam has been turned ON but laser energy does not reach said remote module, indicating a break in said high energy optical fiber;

a high energy optical fiber for transmitting material processing laser energy, the input end of said high energy optical fiber coupled to receive the beam from said material processing laser, and the output end of said high energy optical fiber connected to said remote module;

a fiber optic bundle for transmitting an image, one end of said fiber optic bundle coupled to said image processing device, and the other end of said fiber optic bundle connected to said remote module;

a seam tracking pattern generator coupled to said one end of said fiber optic bundle for projecting a seam tracking pattern onto the workpiece for viewing by said imaging processing device; and said remote module including a plural path optical system for focusing the laser beam emerging from the output end of said high energy optical fiber along a first optical path to a focal point on the workpiece and for imaging a portion of the workpiece along a second optical path onto said other end of said fiber optic bundle, said optical system having a single objective lens serving both said first and said second optical paths.

11. An integrated laser material processing and imaging system comprising:
a material processing laser for providing a laser beam;
an image processing device for receiving and processing an image;
a remote module adapted for manipulation by a robot in the proximity of a workpiece;
a high energy optical fiber for transmitting material processing laser energy, the input end of said high energy optical fiber coupled to receive the beam from said material processing laser, and the output end of said high energy optical fiber connected to said remote module;
a fiber optic bundle for transmitting an image, one end of said fiber optic bundle coupled to said image processing device, and the other end of said fiber optic bundle connected to said remote module;
said remote module including a plural path optical system for focusing the laser beam emerging from the output end of said high energy optical fiber along a first optical path to a focal point on the workpiece and for imaging a portion of the workpiece along a second optical path onto said other end of said fiber optic bundle, said optical system having a single objective lens serving both said first and said second optical paths;
said output end of said high energy optical fiber and said first optical path are physically on an in-line axis in axial alignment with said objective lens; and
said other end of said fiber optic bundle and said second optical path are physically on a slant axis which intersects said in-line axis at the focal point.

12. An integrated laser material processing and imaging system comprising:
a material processing laser for providing a laser beam;
an image processing device for receiving and processing an image;
a remote module adapted for manipulation by a robot in the proximity of a workpiece;
a high energy optical fiber for transmitting material processing laser energy, the input end of said high energy optical fiber coupled to receive the beam from said material processing laser, and the output end of said high energy optical fiber connected to said remote module;
a fiber optic bundle for transmitting an image, one end of said fiber optic bundle coupled to said image processing device, and the other end of said fiber optic bundle connected to said remote module;
said remote module including a plural path optical system for focusing the laser beam emerging from the output end of said high energy optical fiber along a first optical path to a focal point on the workpiece and for imaging a portion of the workpiece along a second optical path onto said other end of said fiber optic bundle, said optical system having a single objective lens serving both said first and said second optical paths;
said output end of said high energy optical fiber and said first optical path are physically on an in-line axis in axial alignment with said objective lens;
said other end of said fiber optic bundle and said second optical path are physically on a slant axis which intersects said in-line axis at the focal point; and compensating optics in said second optical path to ensure the image portion of the workpiece is focused onto said fiber optic bundle.

13. An integrated laser material processing and imaging system comprising:
a material processing laser for providing a laser beam;
an image processing device for receiving and processing an image;
a remote module adapted for manipulation by a robot in the proximity of a workpiece;
a high energy optical fiber for transmitting material processing laser energy, the input end of said high energy optical fiber coupled to receive the beam from said material processing laser, and the output end of said high energy optical fiber connected to said remote module;
a fiber optic bundle for transmitting an image, one end of said fiber optic bundle coupled to said image processing device, and the other end of said fiber optic bundle connected to said remote module; and
said remote module including a plural path optical system for focusing the laser beam emerging from the output end of said high energy optical fiber along a first optical path to a focal point on the workpiece and for imaging a portion of the workpiece along a second optical path onto said other end of said fiber optic bundle, said optical system having a single objective lens serving both said first and said second optical paths;
said output end of said high energy optical fiber and said first optical path are physically on an in-line axis in axial alignment with said objective lens;
said other end of said fiber optic bundle is physically on an imaging axis which is non-coincident with said in-line axis; and
a dichroic window positioned on said in-line axis behind said objective lens to define a portion of said in-line axis between said dichroic window and the focal point as a common axis portion, sand dichroic window being angled so as to reflect images between said common axis portions and said imaging axis such that said common axis portion, said dichroic window and said imaging axis are included in said second optical path, while transmitting laser energy on said first optical path.

14. An integrated laser material processing and imaging system comprising:
a material processing laser for providing a laser beam;
an image processing device for receiving and processing an image;
a remote module adapted for manipulation by a robot in the proximity of a workpiece;
a high energy optical fiber for transmitting material processing laser energy, the input end of said high energy optical fiber coupled to receive the beam from said material processing laser, and the output end of said high energy optical fiber connected to said remote module;
a fiber optic bundle for transmitting an image, one end of said fiber optic bundle coupled to said image processing device, and the other end of said fiber optic bundle connected to said remote module;
said remote module including a plural path optical system for focusing the laser beam emerging from the output end of said high energy optical fiber along a first optical path to a focal point on the workpiece and for imaging a portion of the workpiece along a second optical path onto said other end of said fiber optic bundle, said optical system having a single objective lens serving both said first and said second optical paths;

said output end of said high energy optical fiber and said first optical path are physically on an in-line axis in axial alignment with said objective lens;

said other end of said fiber optic bundle is physically on an imaging axis which is non-coincident with said in-line axis;

a dichroic window positioned on said in-line axis behind said objective lens to define a portion of said in-line axis between said dichroic window and the focal point as a common axis portion, sand dichroic window being angled so as to reflect images between said common axis portions and said imaging axis such that said common axis portion, said dichroic window and said imaging axis are included in said second optical path, while transmitting laser energy on said first optical path; and said imaging axis is parallel to said in-line axis, and said second optical path also includes an image reflecting element cooperating with said dichroic window to fold said second optical path.

15. An integrated laser material processing and imaging system comprising:

a material processing laser for providing a laser beam;

an image processing device for receiving and processing an image;

a remote module adapted for manipulation by a robot in the proximity of a workpiece;

a high energy optical fiber for transmitting material processing laser energy, the input end of said high energy optical fiber coupled to receive the beam from said material processing laser, and the output end of said high energy optical fiber connected to said remote module;

a fiber optic bundle for transmitting an image, one end of said fiber optic bundle coupled to said image processing device, and the other end of said fiber optic bundle connected to said remote module;

said remote module including a plural path optical system for focusing the laser beam emerging from the output end of said high energy optical fiber along a first optical path to a focal point on the workpiece and for imaging a portion of the workpiece along a second optical path onto said other end of said fiber optic bundle, said optical system having a single objective lens serving both said first and said second optical paths;

said output end of said high energy optical fiber and said first optical path are physically on an in-line axis in axial alignment with said objective lens;

said other end of said fiber optic bundle is physically on an imaging axis which is non-coincident with said in-line axis;

a dichroic window positioned on said in-line axis behind said objective lens to define a portion of said in-line axis between said dichroic window and the focal point as a common axis portion, sand dichroic window being angled so as to reflect images between said common axis portions and said imaging axis such that said common axis portion, said dichroic window and said imaging axis are included in said second optical path, while transmitting laser energy on said first optical path; and compensating optics in said second optical path to ensure the image portion of the workpiece is focused onto said fiber optic bundle.

16. An integrated laser material processing and imaging system comprising:

a material processing laser for providing a laser beam;

an image processing device for receiving and processing an image;

a remote module adapted for manipulation by a robot in the proximity of a workpiece;

a high energy optical fiber for transitting material processing laser energy, the input end of said high energy optical fiber coupled to receive the beam from said material processing laser, and the output end of said high energy optical fiber connected to said remote module;

a fiber optic bundle for transmitting an image, one end of said fiber optic bundle coupled to said image processing device, and the other end of said fiber optic bundle connected to said remote module;

said remote module including a plural path optical system for focusing the laser beam emerging from the output end of said high energy optical fiber along a first optical path to a focal point on the workpiece and for imaging a portion of the workpiece along a second optical path onto said other end of said fiber optic bundle, said optical system having a single objective lens serving both said first and said second optical paths;

said other end of said fiber optic bundle and said second optical path are physically on an in-line axis in axial alignment with said objective lens;

said output end of said high energy optical fiber is physically on an energy delivery axis which is non-coincident with said in-line axis; and a dichroic mirror positioned on said in-line axis behind said objective lens to define a portion of said in-line axis between said dichroic mirror and the focal point as a common axis portion, sand dichroic mirror being angled so as to reflect laser energy from said energy delivery axis axis onto said common axis portion, said dichroic mirror and said energy delivery axis are included in said first optical path, while said dichroic mirror transmits images on said second optical path.

17. An integrated laser material processing and imaging system comprising:

a material processing laser for providing a laser beam;

an image processing device for receiving and processing an image;

a remote module adapted for manipulation by a robot in the proximity of a workpiece;

a high energy optical fiber for transmitting material processing laser energy, the input end of said high energy optical fiber coupled to receive the beam from said material processing laser, and the output end of said high energy optical fiber connected to said remote module;

a fiber optic bundle for transmitting an image, one end of said fiber optic bundle coupled to said image processing device, and the other end of said fiber optic bundle connected to said remote module;

said remote module including a plural path optical system for focusing the laser beam emerging from the output end of said high energy optical fiber along a first optical path to a focal point on the workpiece and for imaging a portion of the workpiece along a second optical path onto said other end of said fiber optic bundle, said optical system having a single objective lens serving both said first and said second optical paths;

said other end of said fiber optic bundle and said second optical path are physically on an in-line axis in axial alignment with said objective lens;

said output end of said high energy optical fiber is physically on an energy delivery axis which is non-coincident with said in-line axis;

a dichroic mirror positioned on said in-line axis behind said objective lens to define a portion of said in-line axis between said dichroic mirror and the focal point as a common axis portion, sand dichroic mirror being angled so as to reflect laser energy from said energy delivery axis axis onto said common axis portion, said dichroic mirror and said energy delivery axis are included in said first optical path, while said dichroic mirror transmits images on said second optical path; and said energy delivery axis is parallel to said in-line axis, and said first optical path also includes a laser beam reflecting element cooperating with said dichroic mirror to fold said first optical path.

18. An integrated laser material processing and imaging system comprising:

a material processing laser for providing a laser beam;

an image processing device for receiving and processing an image;

a remote module adapted for manipulation by a robot in the proximity of a workpiece;

a high energy optical fiber for transmitting material processing laser energy, the input end of said high energy optical fiber coupled to receive the beam from said material processing laser, and the output end of said high energy optical fiber connected to said remote module;

a fiber optic bundle for transmitting an image, one end of said fiber optic bundle coupled to said image processing device, and the other end of said fiber optic bundle connected to said remote module;

said remote module including a plural path optical system for focusing the laser beam emerging from the output end of said high energy optical fiber along a first optical path to a focal point on the workpiece and for imaging a portion of the workpiece along a second optical path onto said other end of said fiber optic bundle, said optical system having a single objective lens serving both said first and said second optical paths;

said other end of said fiber optic bundle and said second optical path are physically on an in-line axis in axial alignment with said objective lens;

said output end of said high energy optical fiber is physically on an energy delivery axis which is non-coincident with said in-line axis;

a dichroic mirror positioned on said in-line axis behind said objective lens to define a portion of said in-line axis between said dichroic mirror and the focal point as a common axis portion, sand dichroic mirror being angled so as to reflect laser energy from said energy delivery axis axis onto said common axis portion, said dichroic mirror and said energy delivery axis are included in said first optical path, while said dichroic mirror transmits images on said second optical path; and compensating optics in said second optical path to ensure the imaged portion of the workpiece is focused onto said fiber optic bundle.

* * * * *